(12) United States Patent
Simon et al.

(10) Patent No.: US 6,563,069 B2
(45) Date of Patent: May 13, 2003

(54) HORN SWITCH

(75) Inventors: Gerard K. Simon, Huber Heights, OH (US); Thomas T. Conlon, Kettering, OH (US); Ruben F. Salazar, Juarez (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/876,639

(22) Filed: Jun. 7, 2001

(65) Prior Publication Data

US 2002/0185361 A1 Dec. 12, 2002

(51) Int. Cl.⁷ .............................................. H01H 1/10
(52) U.S. Cl. ................................. 200/512; 200/61.54
(58) Field of Search .................... 200/512, 517, 200/5 A, 61.54, 61.55, 200, 341

(56) References Cited

U.S. PATENT DOCUMENTS

| | | | |
|---|---|---|---|
| 4,605,828 A | 8/1986 | Gostomski, Jr. et al. | 200/5 A |
| 4,675,787 A | 6/1987 | Suwa | 361/401 |
| 4,934,735 A | 6/1990 | Embach | |
| 5,085,461 A | 2/1992 | Shibata | 280/731 |
| 5,186,490 A | 2/1993 | Adams et al. | 280/731 |
| 5,193,669 A | 3/1993 | Demeo et al. | 200/512 |
| 5,198,629 A | 3/1993 | Hayashi et al. | 200/61.54 |
| 5,265,904 A | 11/1993 | Shelton et al. | |
| 5,308,106 A | 5/1994 | Heidorn | 280/728 B |
| 5,369,232 A | 11/1994 | Leonelli | 200/61.54 |
| 5,399,819 A | 3/1995 | Lang et al. | 200/61.54 |
| 5,431,437 A | 7/1995 | Nichols et al. | 280/731 |
| 5,465,998 A | 11/1995 | Davis | 280/731 |
| 5,487,557 A | 1/1996 | Eckhout | 280/728.3 |
| 5,569,893 A | 10/1996 | Seymour | 100/61.54 |
| 5,575,498 A | 11/1996 | Elquadah et al. | 280/731 |
| 5,630,617 A | 5/1997 | Hashiba | |
| 5,639,998 A * | 6/1997 | Ricks et al. | 200/61.54 |
| 5,642,901 A | 7/1997 | Bowman et al. | 280/728.3 |
| 5,684,283 A | 11/1997 | Hambleton, Jr. et al. | 200/61.08 |
| 5,723,834 A | 3/1998 | Hambleton, Jr. et al. | 200/61.54 |
| 5,836,609 A | 11/1998 | Coleman | 280/728.3 |
| 5,856,646 A | 1/1999 | Simon | 200/600 |
| 5,934,702 A | 8/1999 | Coleman | 280/731 |
| 5,947,512 A | 9/1999 | Magoteaux et al. | 280/731 |
| 5,957,488 A | 9/1999 | Lehman | 280/731 |
| 5,964,477 A | 10/1999 | Lehman | 280/728.3 |
| 6,010,148 A | 1/2000 | Leonelli, Jr. et al. | 280/728.3 |
| 6,079,737 A | 1/2000 | Isomura et al. | 280/731 |
| 6,039,343 A | 3/2000 | Scherer | 280/731 |
| 6,050,597 A | 4/2000 | Coleman | 280/731 |
| 6,079,734 A | 6/2000 | Porter | 280/728.3 |
| 6,320,147 B1 * | 11/2001 | Simpson | 172/333 |

FOREIGN PATENT DOCUMENTS

| | | |
|---|---|---|
| JP | 8-301039 | 11/1996 |

\* cited by examiner

*Primary Examiner*—Elvin Enad
*Assistant Examiner*—Marina Fishman
(74) *Attorney, Agent, or Firm*—Kathryn A. Marra

(57) ABSTRACT

A membrane horn switch assembly for operating a horn of a vehicle, the horn switch assembly includes a membrane switch with an upper nonconductive sheet having a first electrically conductive coating and a lower nonconductive sheet with a second electrically conductive coating, the second electrically conductive coating including a first conductive grid and a second conductive grid, the first electrically conductive coating being in a facially spaced relationship with respect to the second electrically conductive coating. A nonconductive spacer is positioned in between the first electrically conductive coating and the second electrically conductive coating, the nonconductive spacer having a plurality of openings aligning with portions of the first conductive grid and said second conductive grid. A plurality of first concentrators and second concentrators depend upwardly from a reaction surface, the plurality of first concentrators maintaining the second plurality of concentrators in a facing spaced relationship with respect to the membrane horn switch, the plurality of second concentrators selectively communicating portions of the first conductive grid and second conductive grid, when a force is applied to the horn switch assembly.

5 Claims, 16 Drawing Sheets

HORN SWITCH

CROSS REFERENCE TO RELATED APPLICATIONS

This application is related to commonly owned and assigned U.S. patent application Ser. Nos. 09/473,288 and 09/473,292 both filed Dec. 28, 1999, the contents of which are incorporated herein by reference thereto.

TECHNICAL FIELD

The present invention relates generally to a horn switch, and more particularly, to a membrane horn switch for use with a deployable air bag in a vehicle.

BACKGROUND

This invention relates to a membrane horn switch for use with a driver side supplemental inflatable restraint (SIR) system. Driver side SIR systems typically include an air bag stored in a housing module. These systems are designed to actuate in response to an activation signal in order to rapidly deploy an air bag. A driver side SIR system is normally positioned under a cover within a hub of a steering wheel. In addition, a horn activating switch is also positioned in the same area.

SIR systems are designed such that an inflating air bag cushion is forced out through a cover on the steering wheel in a predetermined manner through a cover tear seam. Because of the location of the horn switch, the switch also has to be designed to accommodate the deploying air bag.

Membrane horn switches require some form of a rigid base to be compressed against. Having the SIR system and the membrane horn switch located within the steering wheel hub calls for the components that make up the SIR system and the membrane horn switch to be tightly packed. When the membrane horn switch is tightly packed between a folded air bag cushion and the steering wheel cover, it may be susceptible to inadvertent actuation. This inadvertent actuation could occur with a minor accidental bumping of the steering wheel cover or with a temperature related compression on the steering wheel cover caused by the expansion or contraction of the integrated parts due to extremes in temperature.

For example, and when the temperature is very cold the steering wheel cover could contract without any pressure exerted on it by the vehicle driver. The temperature related contraction of the steering wheel cover would therefore cause the switch to react in the way it responds when the driver exerts pressure on the steering wheel cover. Accordingly, the horn will sound because the conductive surfaces on the substrate and the flexible membrane are forced together to complete the horn circuit. However, unlike actuation of the horn by hand pressure, the contraction that takes place due to the extreme cold temperature causes the horn switch to remain in the contracted position in which the conductive surfaces are in contact until the temperature rises causing the cover to expand to its original position in which the conductive surfaces are separate from one another. This results in the constant sound of the horn in cold temperatures.

Another consideration in designing membrane horn switches is the amount of pressure needed to actuate the membrane horn switch. It is therefore desirous to have a membrane horn switch that can be activated with a consistent minimal pressure. However, orienting the conductive surfaces close together as is needed for minimal contact actuation also has the added risk of the unintentional closing of the circuit or sounding of the horn.

It is therefore desirable to provide a dual contact membrane horn switch assembly that when exposed to extremes in temperature will not trigger actuation of the switch and thereby sound the vehicle's horn. In addition, it is desirous to provide a dual contact membrane horn switch assembly which requires consistent minimal pressure to close the circuit and thereby actuate the vehicle's horn.

SUMMARY

A membrane horn switch is provided. The membrane horn switch is for use in a vehicle having a driver side air bag positioned between a steering wheel and an air bag cover. In an exemplary embodiment, the membrane horn switch comprises a top nonconductive sheet with an electrically conductive coating on a bottom surface thereof, a bottom nonconductive sheet having an electrically conductive coating on a top surface thereof, and a nonconductive spacer disposed intermediate the top and bottom nonconductive sheets.

Defined within the top, bottom and nonconductive spacer sheets are a first main switch section and a second main switch section. A bridging section selectively interconnects the first main switch section and the second main switch section. The bridging section includes a bridging tear seam extending between the first and second main switch sections. The membrane horn switch also further includes a pair of electrical leads disposed within the structure such that the pair of leads intersect the bridging tear seam and serve to connect the horn membrane switch to an actuation device (e.g. a horn) so that deployment of the air bag causes the horn membrane switch to be separated because the bridging tear seam is torn resulting in the leads also separating to interrupt a circuit of the horn membrane switch. This results because the bridging tear seam is preferably aligned with the tear seam of the air bag so that deployment of the air bag causes both seams to rupture and sever the tear seam.

Thus, the membrane horn switch is designed so that both hot and neutral leads of the membrane horn switch which connect the switch and the vehicle's horn are located across the tear seam of the switch so that upon deployment of the air bag the bridging tear seam and the switch leads are severed.

A membrane horn switch assembly designed so that a steering wheel cover can expand or contract due to extremes in temperature without the unintentional closing of a circuit used to activate a remote horn. Also, the assembly includes a membrane horn gap which is designed so that the space between the cover or reaction plate concentrators and the switch is minimized thereby requiring less pressure exerted on the steering wheel cover to actuate the switch. Additionally, the steering wheel cover is designed so that a greater deflection in the cover results when using the same amount of pressure as was previously exerted on the cover.

In one embodiment, the membrane horn switch assembly of the present invention comprises a membrane horn switch having an upper flexible substrate sheet having a bottom surface coated with a conductive material, a lower flexible substrate sheet with a conductive positive and a negative grid disposed on a top surface thereof and a dielectric spacer interposed between the upper and lower flexible substrate sheets. The dielectric spacer partially defines a predetermined number of points where an electrical connection may be provided between the upper and lower sheets when assembled.

According to one embodiment, the membrane horn switch has a predetermined datum scheme (i.e., pattern of concentrators) to register switch contact points so that the concentrators are properly orientated relative to the conductive positive and negative grids. This method of registration eliminates dielectric interference in the membrane horn switch. Dielectric interference is one cause of malfunctioning of the membrane horn switch due to improper alignment and contact between layers comprising the membrane horn switch. Furthermore, the membrane horn switch assembly also has locating features that further permit the desired registration of the switch contact points.

In addition, the membrane horn switch is designed so that temperature extremes and inadvertent bumping of the steering wheel cover does not result in the unintentional activation of the membrane horn switch.

The above-described and other features and advantages of the present invention will be appreciated and understood by those skilled in the art from the following detailed description, drawings and appended claims.

DETAILED DESCRIPTION OF THE INVENTION

Figure 1:
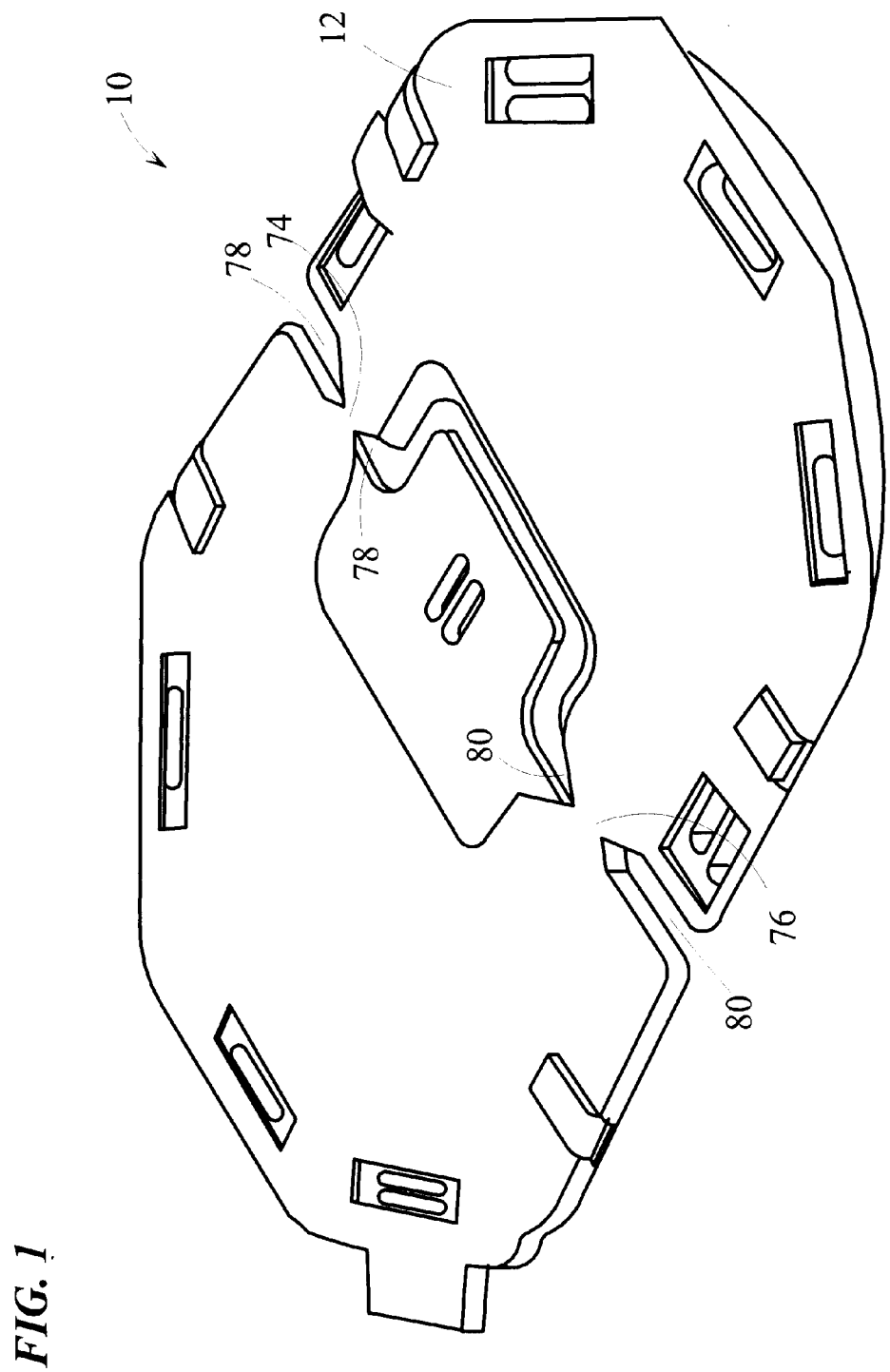
FIG. 1 is a perspective view of a towards switch constructed in accordance with an exemplary embodiment of the present invention.

Referring now to FIGS. 1–4, a dual contact membrane horn switch assembly according to an exemplary embodiment of the present invention is illustrated and generally indicated at 10.

Membrane horn switch assembly 10 includes a flexible member 12. Flexible member 12 comprises an upper nonconductive flexible layer 14 and a lower nonconductive flexible layer 16.

In an exemplary embodiment layers 14 and 16 are formed from a suitable material such as polyethylene or polyester.

A conductive sheet 18 is adhered to a surface of upper nonconductive flexible layer 14. A conductive positive grid 20 and a conductive negative grid 22 are adhered to a surface of lower flexible layer 16. A nonconductive spacer or layer 24 (hereinafter spacer) is positioned intermediate conductive sheet 18 and grids 20 and 22, thus completing flexible member 12. It will be appreciated that any number of suitable conductive materials may be used for conductive sheet 18 and grids 20 and 22, including but not limited to metals such as copper, silver or conductive ink, which can be, screened on the top and bottom layers 14 and 16.

Nonconductive spacer 24 has a plurality of openings or windows 26 that are configured and positioned to allow a portion of either grid 20 or grid 22 to pass therethrough when a force is applied thereto. Once a portion of grid 20 and grid 22 make contact with conductive sheet 18 the circuit of membrane horn switch 10 is complete and the horn will activate.

In an exemplary embodiment, flexible member 12 includes a plurality of openings 28 formed therein in predetermined locations thereof. Preferably, the plurality of openings 28 are formed between a peripheral edge of the conductive material 28 and one of edges of the of the flexible member.

Figure 3:
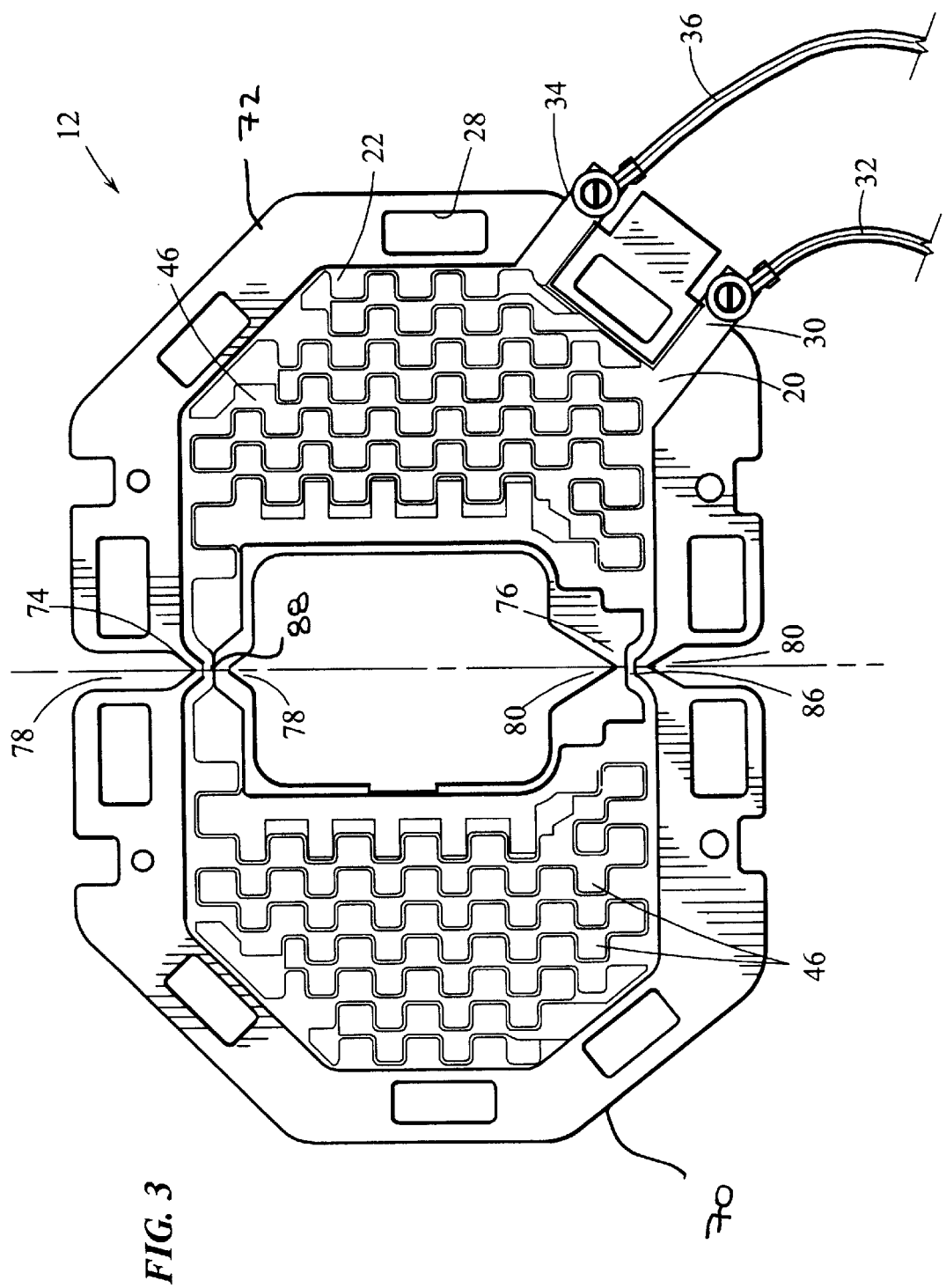
FIG. 3 is a bottom plan view of a flexible membrane switch constructed in accordance with an exemplary embodiment of the present invention.
Figure 4:
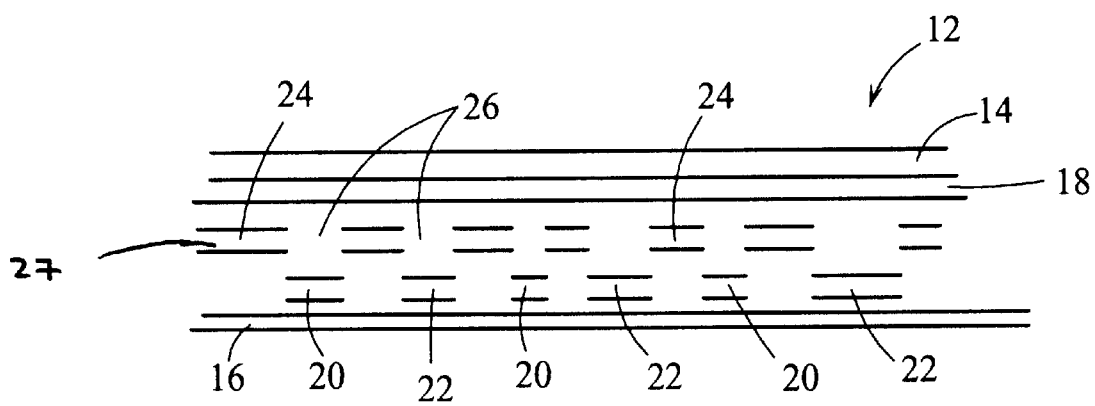
FIG. 4 is a cross-sectional view along lines 4—4 of FIG. 3.

In an exemplary embodiment and as shown in FIG. 3, conductive positive grid 20 and the conductive negative grid 22 are interleaved with each other and substantially in the same plane; however, the conductive grids 20 and 22 are formed such that contact is prevented therebetween.

One portion of the conductive positive grid 20 terminates at a positive terminal 30 to which a positive lead wire 32 is electrically connected thereto. Similarly, the conductive negative grid 22 terminates at a negative terminal 34 to which a negative lead wire 36 is electrically connected thereto.

In assembling the flexible member of membrane horn switch 10, the conductive sheet 18 of the upper nonconductive sheet 14 is positioned so that it faces the conductive positive and negative grids 20 and 22 positioned on the lower nonconductive flexible layer 16. The nonconductive spacer is disposed between the two conductive surfaces, namely conductive sheet 18 and the positive and negative conductive grids 20 and 22. Thus, and when flexible member 12 is a normal default position, the conductive sheet 18, and grids 20 and 22 are separated from each other and pressure is required to force the conductive surfaces into contact with each other. The plurality of openings 26 formed in the nonconductive spacer permits the conductive positive and negative grids 20 and 22 to contact the conductive sheet 18 when a portion thereof is forced through openings 26 as a force is applied to a flexible member 12.

Accordingly, electrical contact between the conductive sheet 18, and grids 20 and 22 is made through the plurality of openings or gaps 26.

Figure 6:
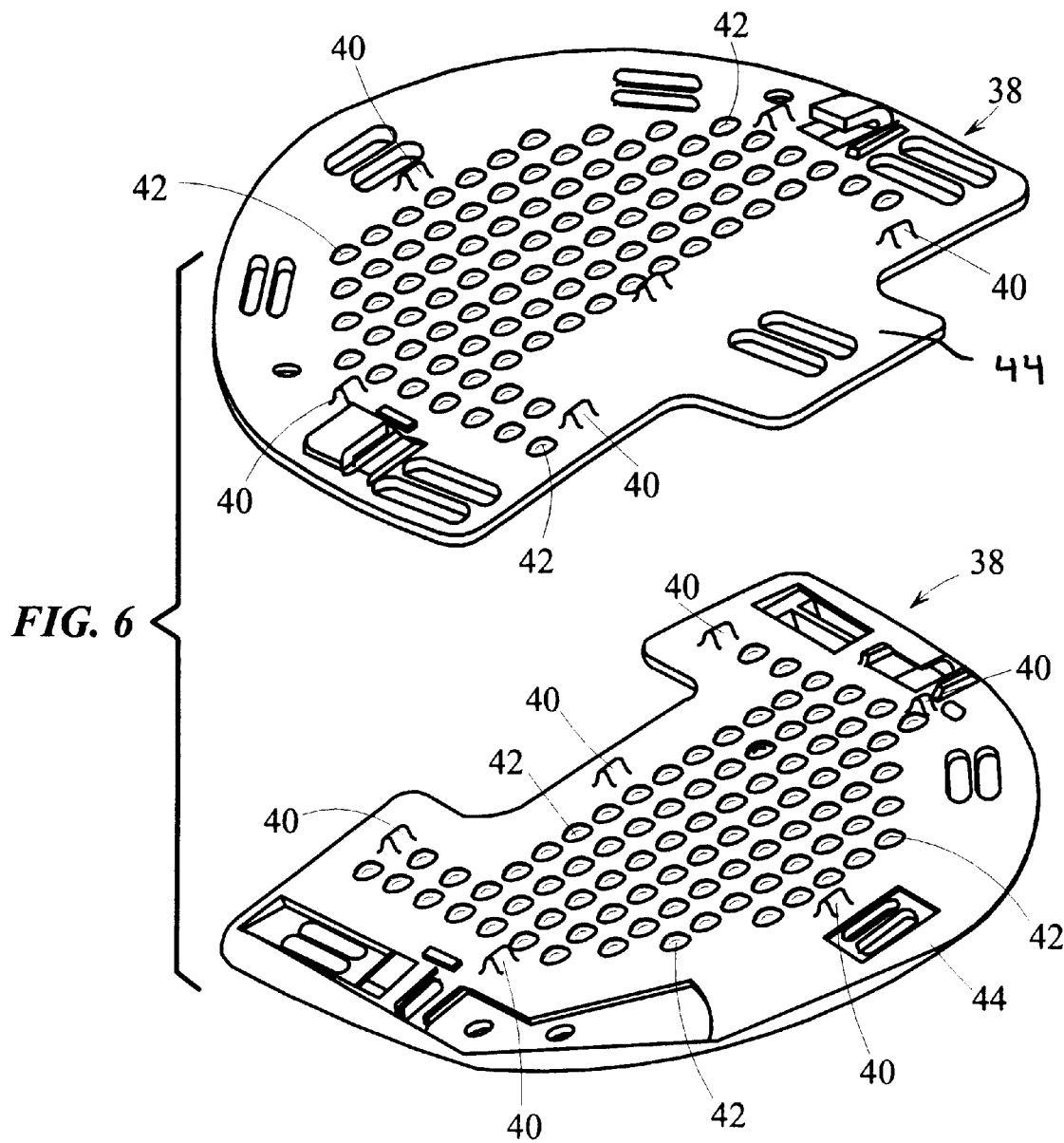
FIG. 6 is a perspective view of portions of the horn switch assembly.
Figure 7:
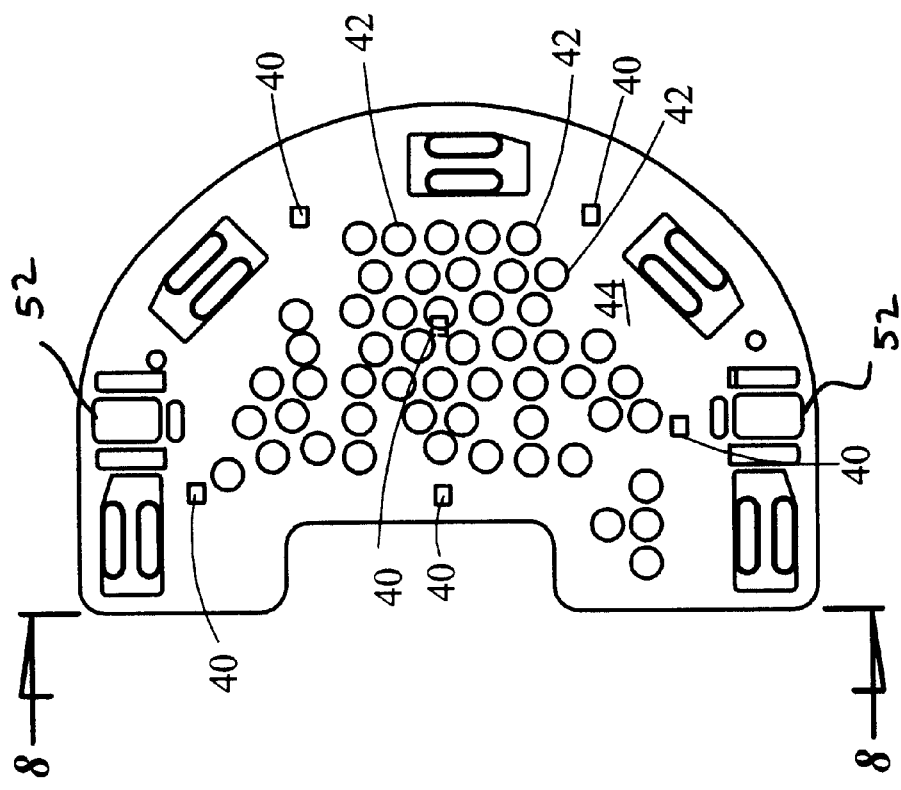
FIG. 7 is a top plan view of portions of the horn switch assembly.
Figure 8:
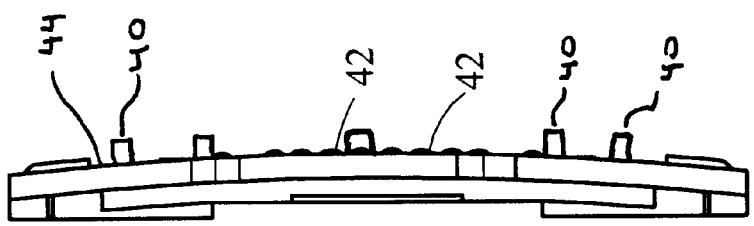
FIG. 8 is a view along lines 8—8 of FIG. 7.

Referring now to FIGS. 6–8, a pair of reaction plates 38 are illustrated. Reaction plates 38 are configured for securement to flexible member 12 to form switch 10 (FIG. 1). Reaction plates 38 are integrally formed with a plurality of first concentrators 40 and a plurality of second concentrators 42. In the exemplary embodiment, the plurality of first and second concentrators 40 and 42, comprise elongated members or protrusions which extend upwardly away from a top surface 44 of the reaction plates.

Figure 12:
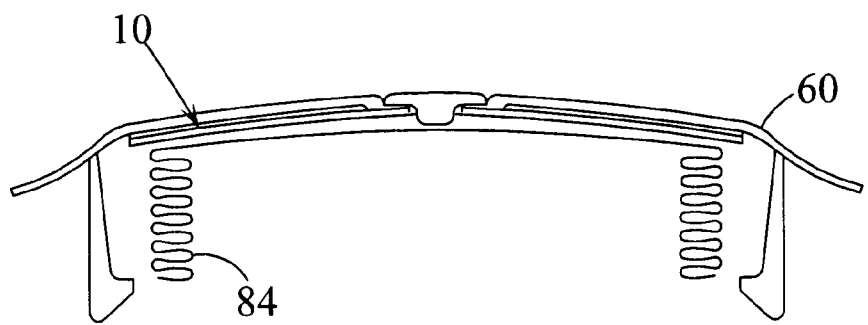
FIG. 12 is a view along lines 12—12 of FIG. 11.

In an exemplary embodiment reaction plates 38 are configured to have a curvature of approximately three degrees (FIG. 8) matching the complementary curvature of the cover of the airbag assembly (FIG. 12). Of course, it is contemplated that reaction plates 38 and the cover may have curvatures greater or less than three degrees.

In an exemplary embodiment, first concentrators 40 have a length from surface 44 that is greater than a length of the plurality of second concentrators 42 from the surface. The first and second concentrators 40 and 42 are arranged according to a predetermined pattern designed so that when flexible member 12 secured to plates 38 and pressure is exerted against the flexible member causing the conductive positive and negative grids 20 and 22 to be in electrical contact with conductive sheet 18.

First concentrators 40 are positioned so that in an assembled state the first concentrators are positioned about the periphery of the conductive positive and negative grids. Thus, only the plurality of second concentrators make contact with the grids when an activation force is applied to the switch.

In addition, the first concentrators maintain flexible member 12 in a facing spaced relationship with respect to second concentrators 42 so as to avoid inadvertent horn activation due to thermal expansion and contraction of the steering wheel cover.

Figure 9:
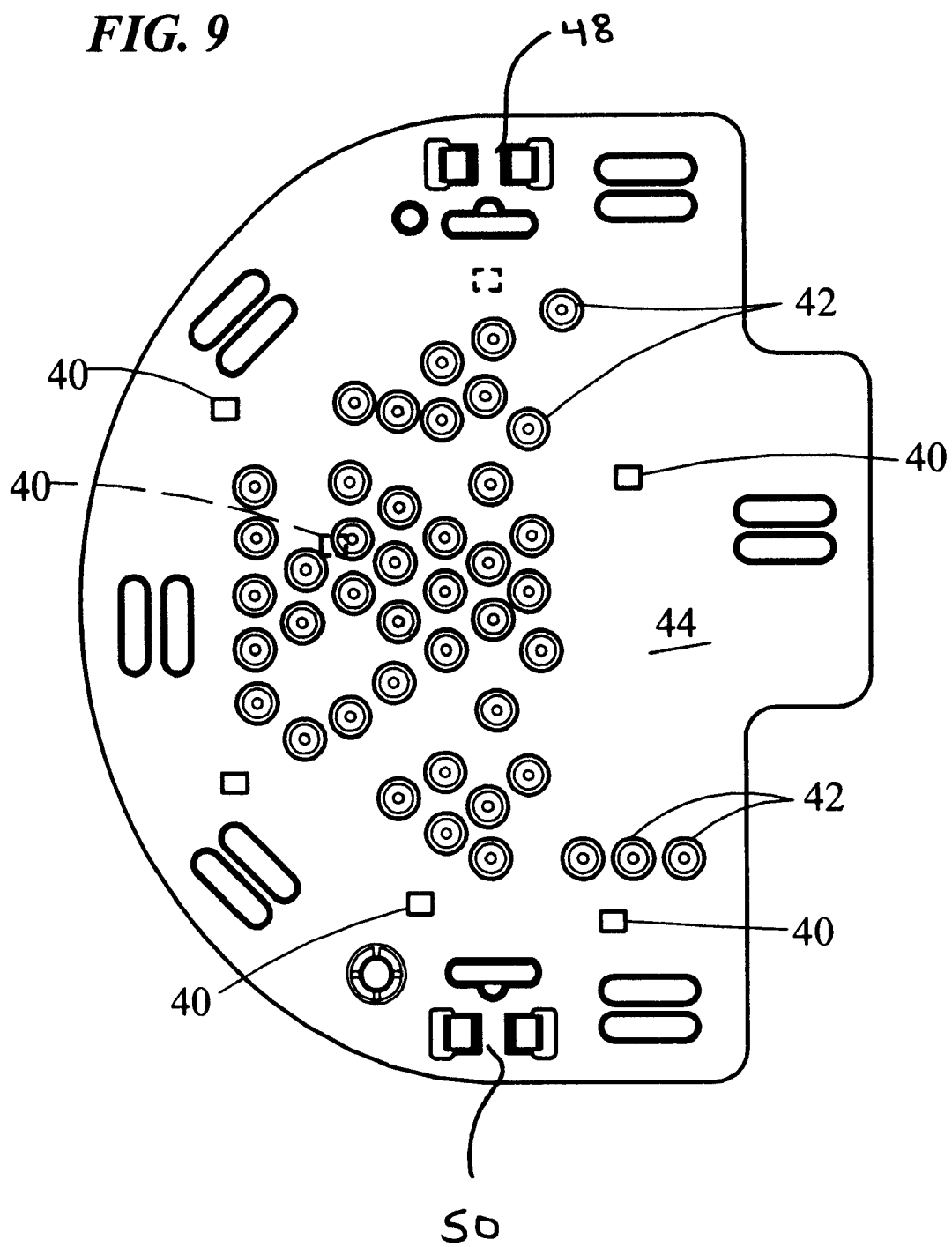
FIG. 9 is a top plan view of an alternative embodiment.
Figure 10:
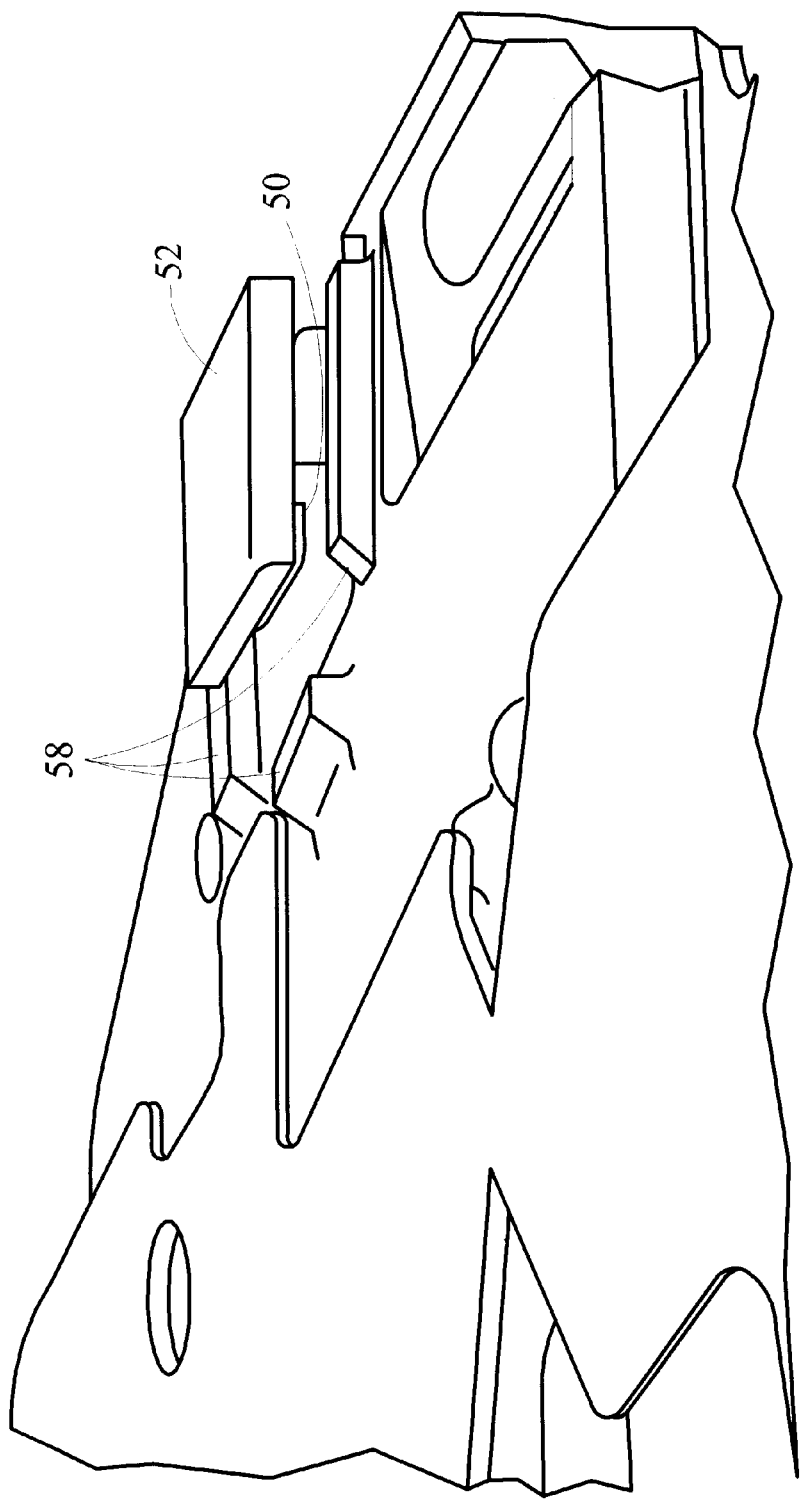
FIG. 10 is a perspective view of a portion of the horn switch assembly.

Alternatively, and as illustrated by the dashed lines in FIGS. 7 and 9, some first concentrators 40 may be located within the area defined by the conductive grids in order to maintain the flexible member in a facing spaced relationship with respect to the reaction plates. In this configuration the first concentrator 40 positioned within the conductive grids must be located below a position of non-conductive spacer 24 that does not have an opening 26.

This is because the plurality of second concentrators 42 are arranged on the top surface of the reaction plate in a location below the conductive positive and negative grids 20 and 22 as well as the required opening in nonconductive spacer 24.

The contact of the conductive positive grid 20 with the conductive sheet 18 and then the conductive negative grid 22 with the conductive sheet 18 occurs because of the orientation of the plurality of second concentrators 42 on the top surface of the reaction plate.

Figure 13:
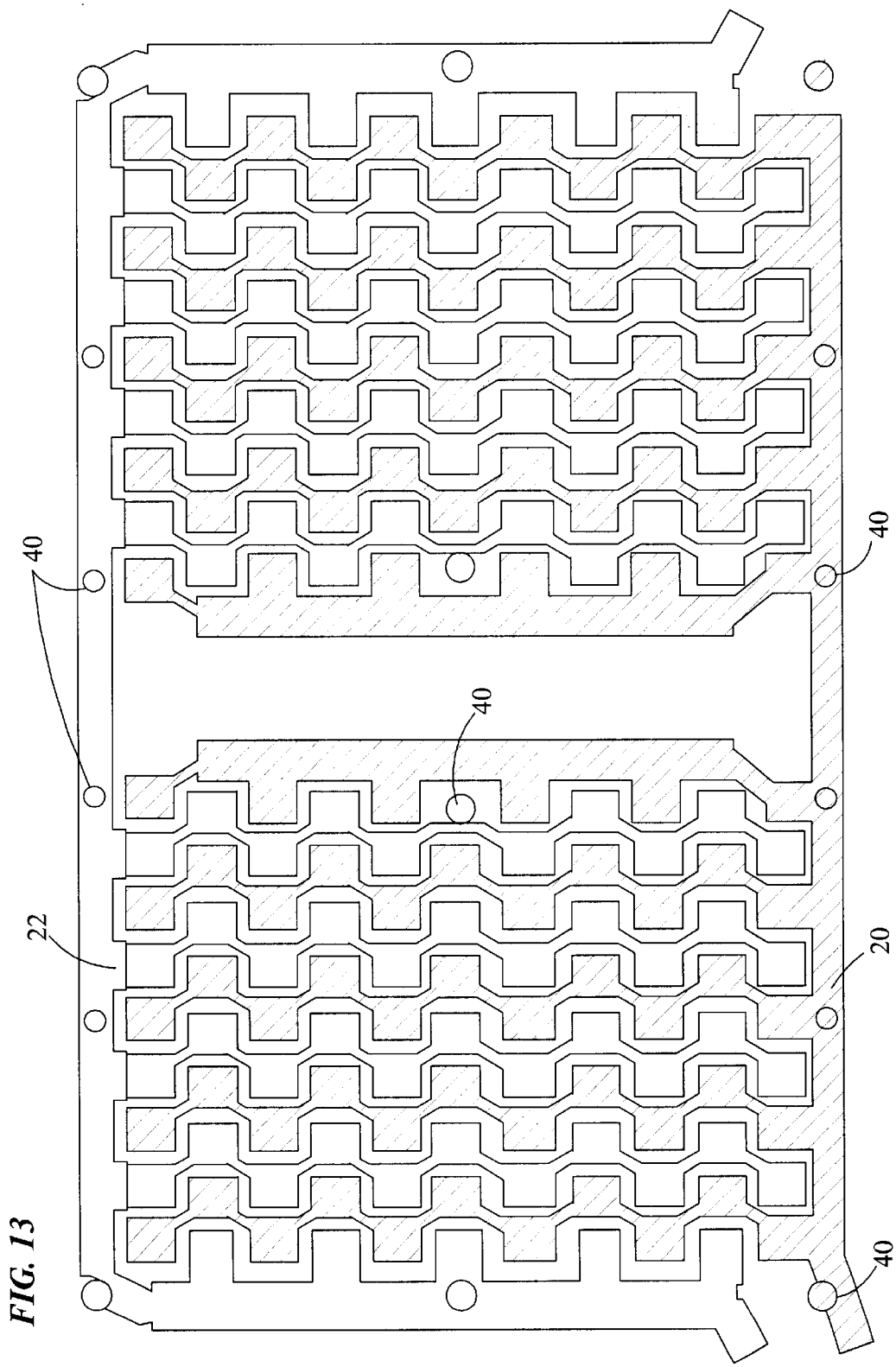
FIGS. 13–19 illustrate alternative embodiment of the present invention.
Figure 14:
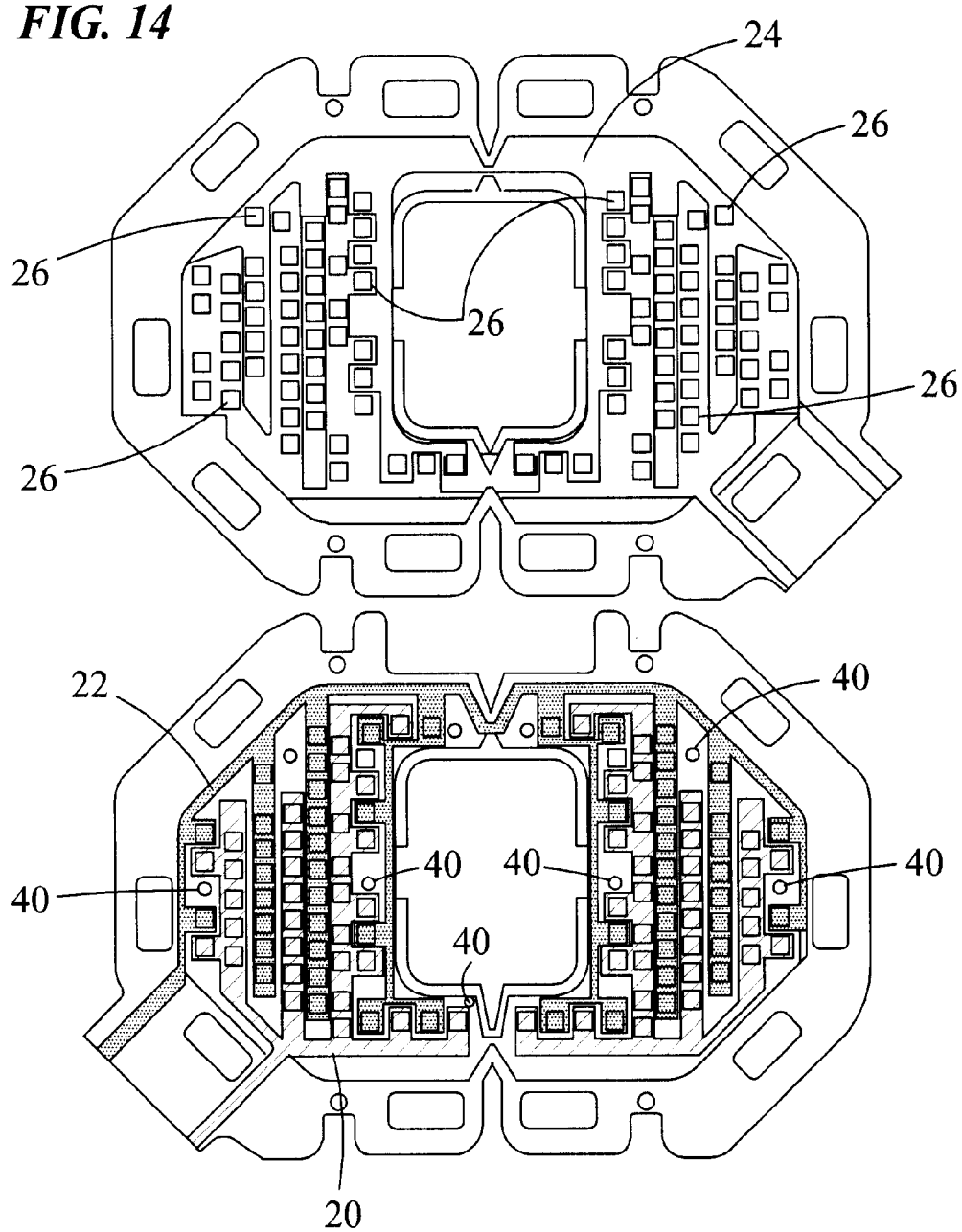
Figure 15:
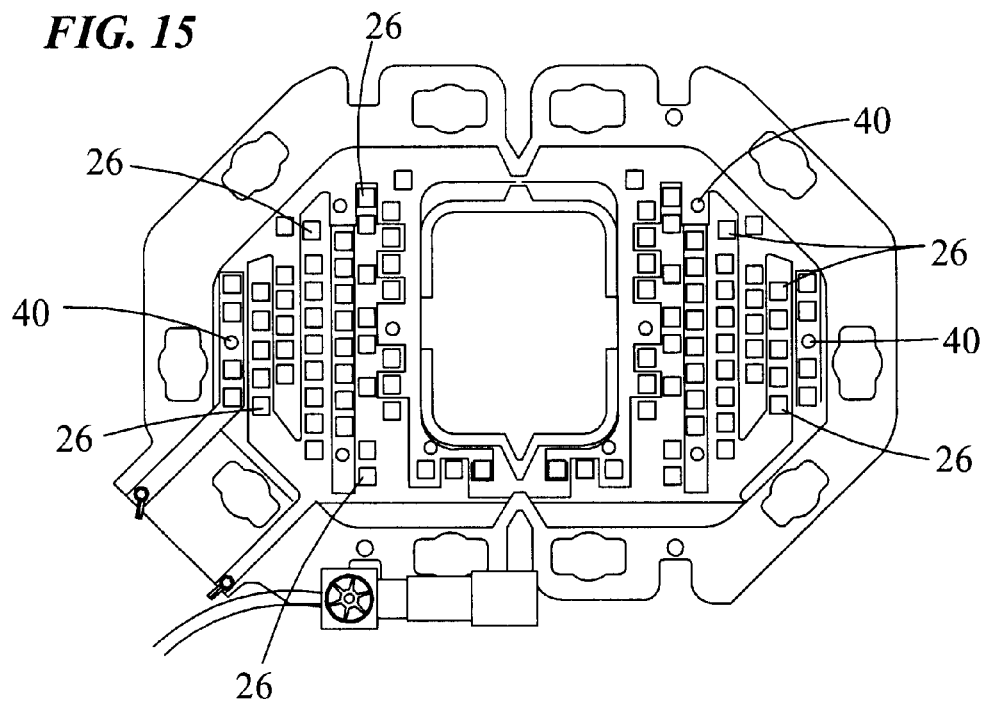
Figure 16:
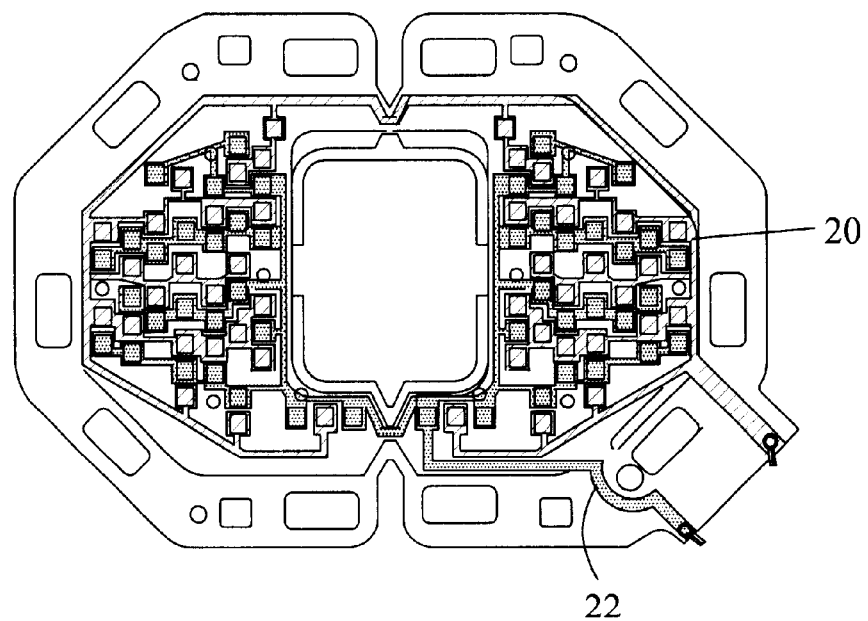
Figure 17:
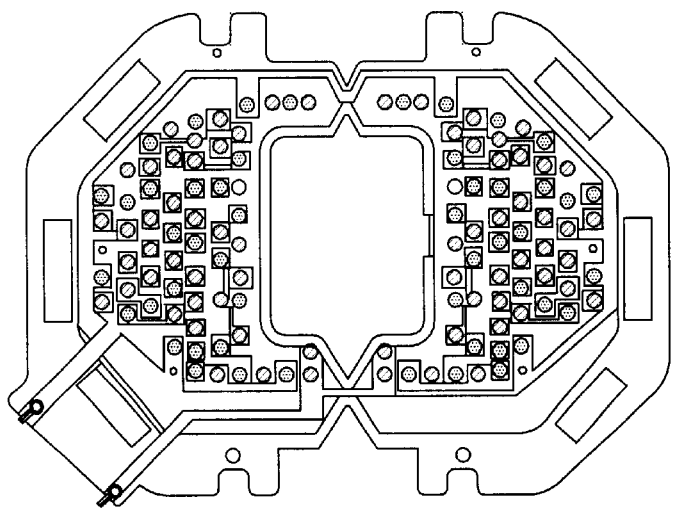
Figure 18:
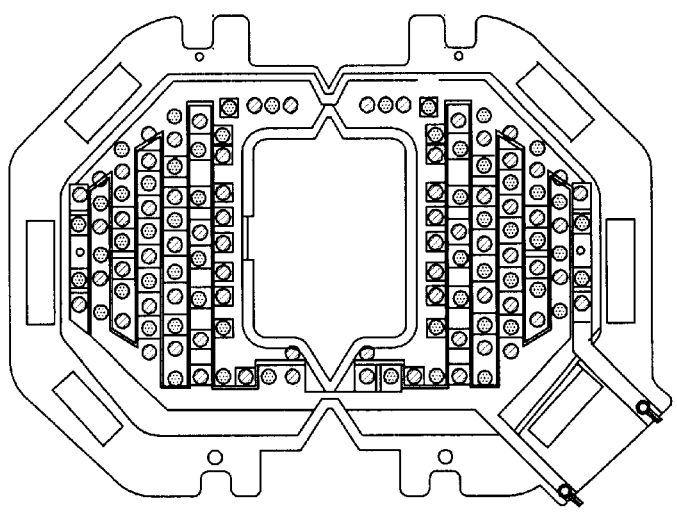
Figure 19:
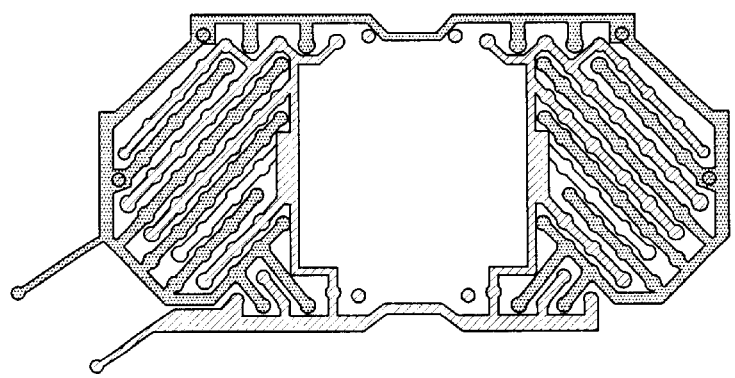

In addition, and referring now to FIGS. 13 and 14, and as yet another alternative, more than one first concentrator 40 may be located within the area defined by grids 20 and 22. Here first concentrators 40 are located within the area defined by the grids but are not positioned below the openings in the non-conductive layer.

However, and in accordance with an exemplary embodiment of the present invention, any small deflection of the steering wheel cover will not be sufficient to allow the plurality of second concentrators 42 to actuate the membrane horn switch as the flexible member is mounted in a facing spaced relationship by the plurality of first concentrators 40. As a result, additional pressure on the flexible outer surface of the steering wheel cover is necessary to cause blowing of the horn.

Referring now to FIG. 3, the orientation of conductive grids 20 and 22 are illustrated. In an exemplary embodiment, the negative and positive conductive grids each are configured with a plurality of squares or contact members 46 electrically secured to each other by a portion of their respective grid and a respective lead of the same grid. In addition, each of these squares is arranged in a zigzag orientation. This orientation provides a configuration in which each square either positive or negative is surrounded by at least four squares of the grid having an opposite polarity. This orientation allows the horn to be activated by a localized force. In addition, this configuration will prevent the switch from having areas in which high effort is required in order to activate the horn. Of course, and along the periphery of the grids contact the members are surrounded by less squares of the grid having an opposite polarity.

As an alternative, the configurations of the grids may be such that each contact member is surrounded by less or more than their grids of an opposite polarity.

The configuration of the positive and negative grids make the horn more resistant to inadvertent blow. The horn is more resistant because when the operator blows the horn, their finger or palm is large enough to close both polarities of the switch. However, it is less likely that a bump or contraction of the airbag due to cold will close both the polarities and blow the horn. This is primarily due to opposite polarities of the conductive grids in the zig-zag configuration.

In an exemplary embodiment approximately 30 Newtons of force is required to actually the horn. Of course, and as applications may require, membrane horn switch 10 can be configured to actuate with a force greater or less than 30 Newtons.

Figure 5:
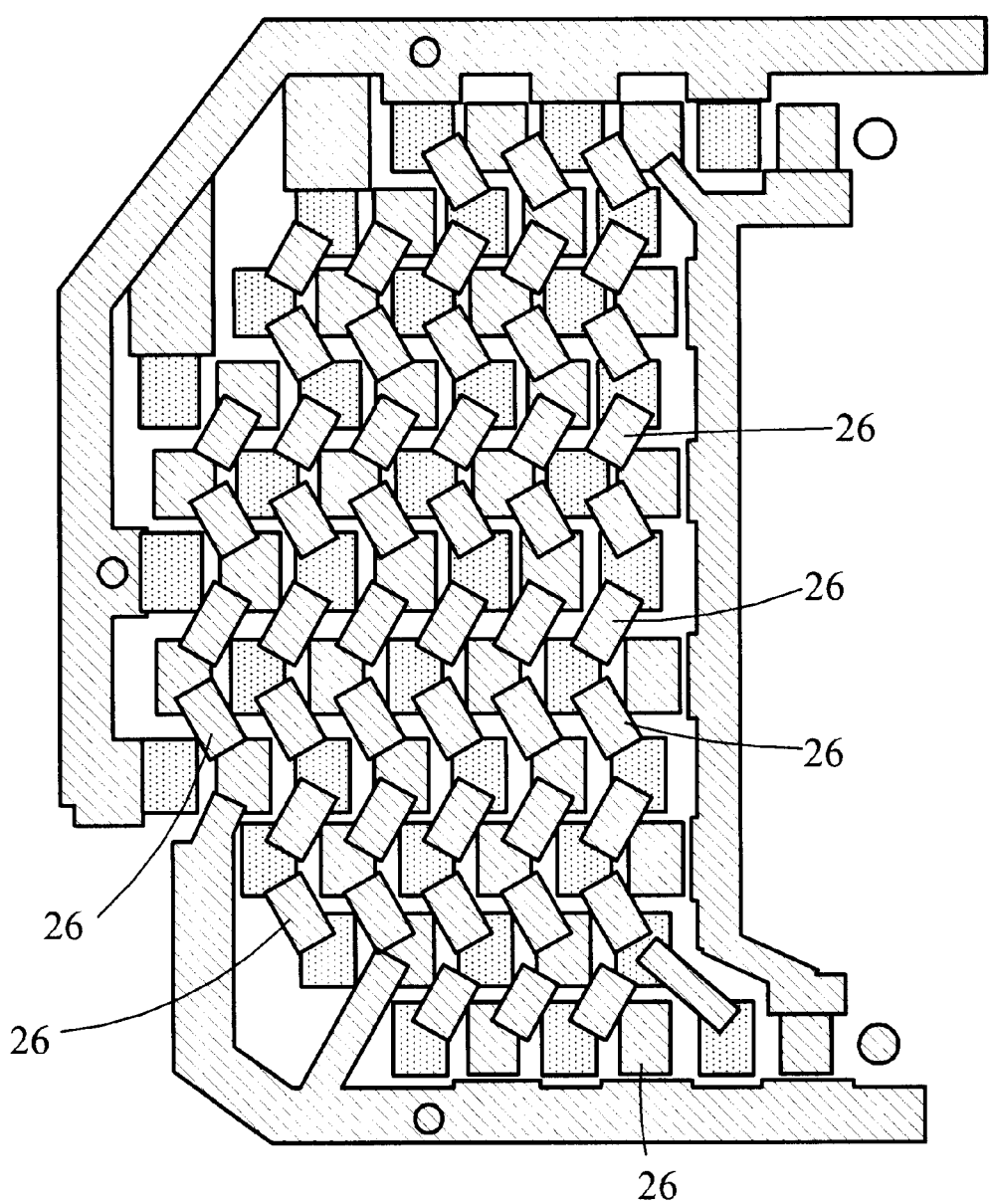
FIG. 5 is a top plan view of portions of the membrane switch.

Referring now to FIG. 5, the configuration of nonconductive spacer 24 and more specifically openings 26 is illustrated. In an exemplary embodiment, the windows or openings of nonconductive spacer 24 are also configured to have a zigzag orientation corresponding to the zigzag orientation of the positive and negative conductive grids. This allows for the contact member of the negative and positive grids to easily make contact with conductive sheet 18 as an actuating force is applied to membrane switch 10 causing concentrators 42 to complete the circuit.

In an alternative embodiment, the nonconductive spacer is formed from a dielectric ink 27 selectively disposed on portions of the conductive positive and negative grids 20 and 22. The dielectric ink 27 is laid down so that a plurality of openings 26 (or gaps in the dielectric ink pattern) are defined and arranged so that the plurality of second concentrators 42 (FIG. 1) are disposed below the openings such that an actuation force upon the membrane switch will cause be negative and positive conductive grids to make contact with conductive sheet 18.

The dielectric ink 27 may also be configured in a zigzag orientation in order to conform to the pattern of the negative and positive grids.

Referring now to FIGS. 7 and 8 in which an exemplary reaction plate 38 is shown. Reaction plate 38 is generally for use with the membrane horn switch of FIGS. 1–4 and is designed so that the plurality of first and second concentrators are preferably integrally formed as part of the reaction plate 38 and extend upwardly from an upper surface 44 thereof. The reaction plate 38 includes a primary datum 48 and a secondary datum 50 formed therein to register the flexible member and more particularly opening 26 thereof with second concentrators 42 when the flexible member is secured to the reaction plates.

Accordingly, the use of the primary datum and the secondary datum serve to eliminate dielectric interference within the membrane horn switch 10 by properly locating and aligning the plurality of second concentrators 42 with respect to the openings in non conductive spacer 24 (FIG. 7) so that an actuating force upon membrane horn switch assembly 10 causes the desired contact between the conductive sheet 18 and the conductive positive and negative grids 20 and 22.

Reaction plates 38 each have a pair of retaining tabs 52 which are positioned to receive a portion of flexible member 12. In an exemplary embodiment, retaining tabs 52 are configured to have either a primary datum or the secondary datum underneath a portion of retaining tabs 52 in order to engage either a primary datum opening 54 or a secondary datum opening 56 of flexible member 12. In an exemplary embodiment, primary datum 48 has a larger configuration data secondary datum opening 56.

Accordingly, primary datum opening 54 has a larger opening than secondary datum opening 56. Thus, the positioning of primary datums 48 and primary datums openings 54 prevent flexible member 12 from being incorrectly affixed to reaction plates 38. In addition, a plurality of supporting members 58 are positioned around the periphery of retaining tabs 52. Supporting members 58 depend upwardly from the surface 44 of the reaction plate and have a profile or height which is lower than the lower surface of the retaining tabs. Accordingly, a portion of flexible member 12 in particular, the portion containing either the primary or secondary datum opening is capable of being inserted underneath retaining tabs 52 and being supported by support members 58. Thus, flexible member 12 is conveniently secured by retaining member 52.

Of course, other securement members for retaining flexible member to reaction plates 38 are contemplated and within the scope of the present invention.

Alternatively, and referring now to FIG. 9 the primary datum and secondary datum can be located on the surface 44 of the reaction plates 38.

Figure 11:
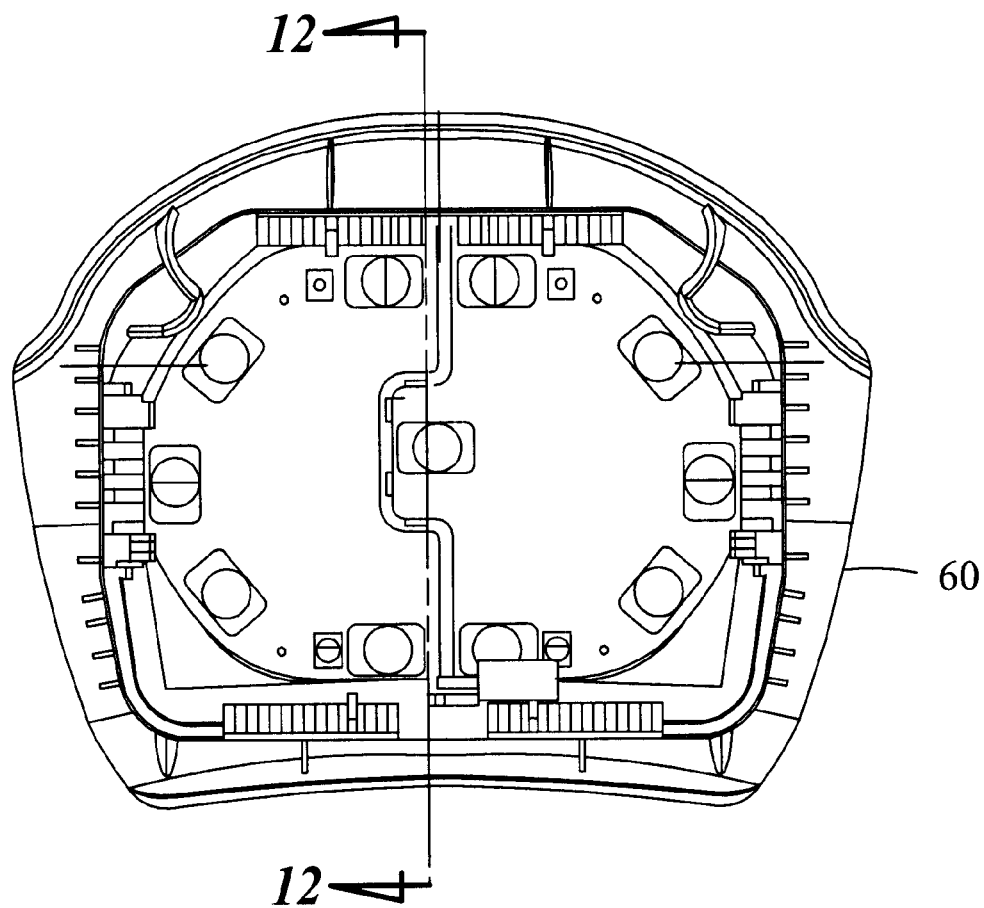
FIG. 11 is a bottom plan view of the horn switch assembly inserted into a steering wheel cover.

Referring now to FIGS. 11 and 12 and in accordance with an exemplary embodiment, the reaction plates are configured so that they may be coupled to membrane horn switch 22 and then inserted within a steering wheel cover 60.

The membrane horn switch 10 allows for a minimal compression of the steering wheel cover before actuation of the membrane horn switch and the subsequent sounding of the vehicle horn. Therefore, parts stored in the hub of the steering wheel can be closely situated and extremes in temperature would not actuate a vehicle's horn. Accordingly, the membrane horn switch assembly 10 has a predetermined datum scheme to register the openings so that second concentrators 42 are properly orientated relative to the conductive positive and negative grids 20 and 22.

This method of registration eliminates dielectric interference in the membrane horn switch. In addition, the membrane horn switch 22 of the present invention is designed so that temperature extremes and inadvertent bumping of the steering wheel cover does not result in the unintentional activation of the membrane horn switch 22.

Figure 2:
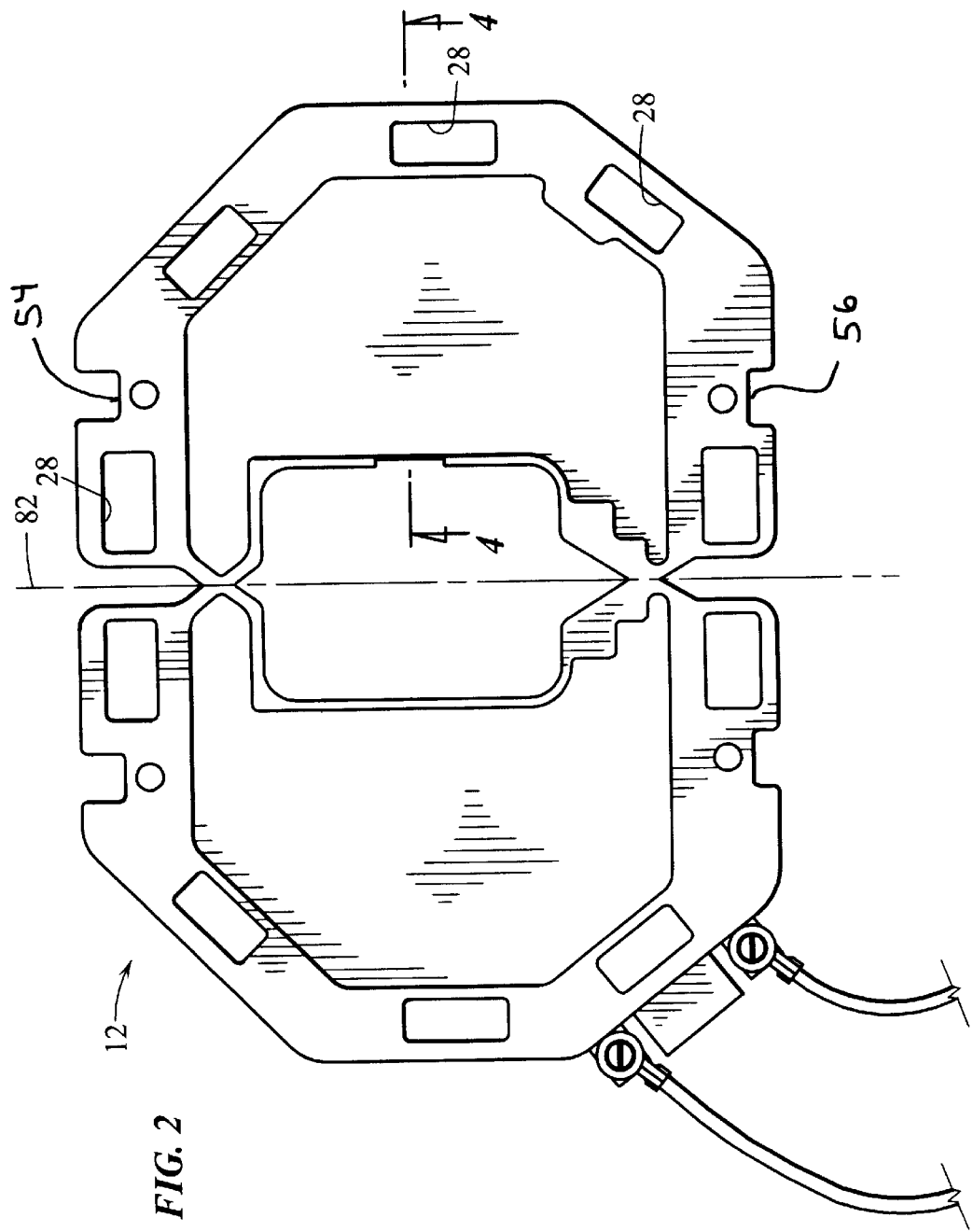
FIG. 2 is a top plan view of a flexible membrane switch constructed in accordance with an exemplary embodiment of the present invention.

Referring now to FIGS. 1–3, flexible member 12 is further defined to include a first section 70 and an opposing second section 72. First section 70 corresponds to one reaction plate and second section 72 corresponds to the other. A pair of bridging members 74 and 76 connect first section 70 to second section 72.

In an exemplary embodiment, bridging members 74 and 76 are defined by a pair of respective notches 78 and 80 in flexible member 12. The notches act to further weaken the respective bridges 74 and 76 formed in flexible member 12. These notches help to enhance the bridges ability to rupture during deployment of an air bag.

As shown in FIG. 2, a seam 82 is created in flexible member 12 to give way during deployment of an air bag 84 (FIG. 12). Seam 82 is also referenced as a bridging tear seam 82.

Accordingly, the membrane horn switch of an exemplary embodiment tears along the bridging tear seam 82 during deployment of the air bag.

While membrane horn switch 10 has been described as having two bridging members, it will be appreciated that any member of bridging members starting with one can be utilized.

Referring now to FIG. 3, a portion 86 of positive grid 20 traverses bridging member 76 while a portion 88 of negative grid 22 traverses bridging members 74. This configuration will ensure that once the air bag 84 (FIG. 12) is deployed and thus forced through the elongated tear seam 82 and a complementary tear seam of cover 60, portions 86 and 88 will also break, thereby terminating the electrical connection between the membrane horn switch 10 and the horn. Once this circuit is terminated, the horn will not function.

Thus, the design of membrane horn switch 10 of the present invention advantageously bars activation of horn during deployment of air bag 84.

Referring now to FIGS. 13–19 alternative configurations of grids 20 and 22 are illustrated.

Figure 20:
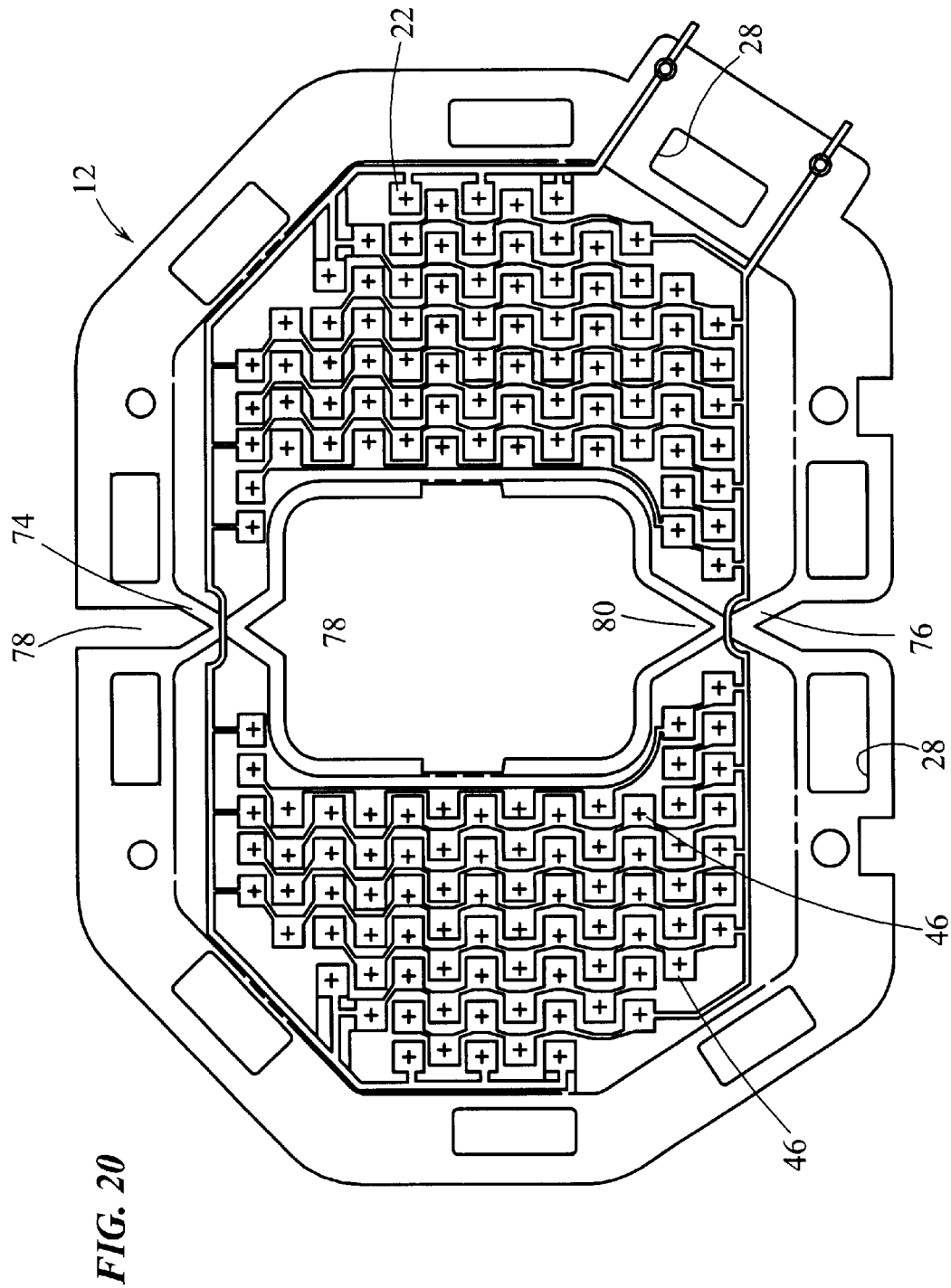
FIG. 20 is a bottom plan view of a flexible membrane switch constructed in accordance with an exemplary embodiment of the present invention.

Turning now to FIG. 20, a bottom plan view of a flexible membrane switch constructed in accordance with an exemplary embodiment of the present invention is illustrated.

Figure 21:
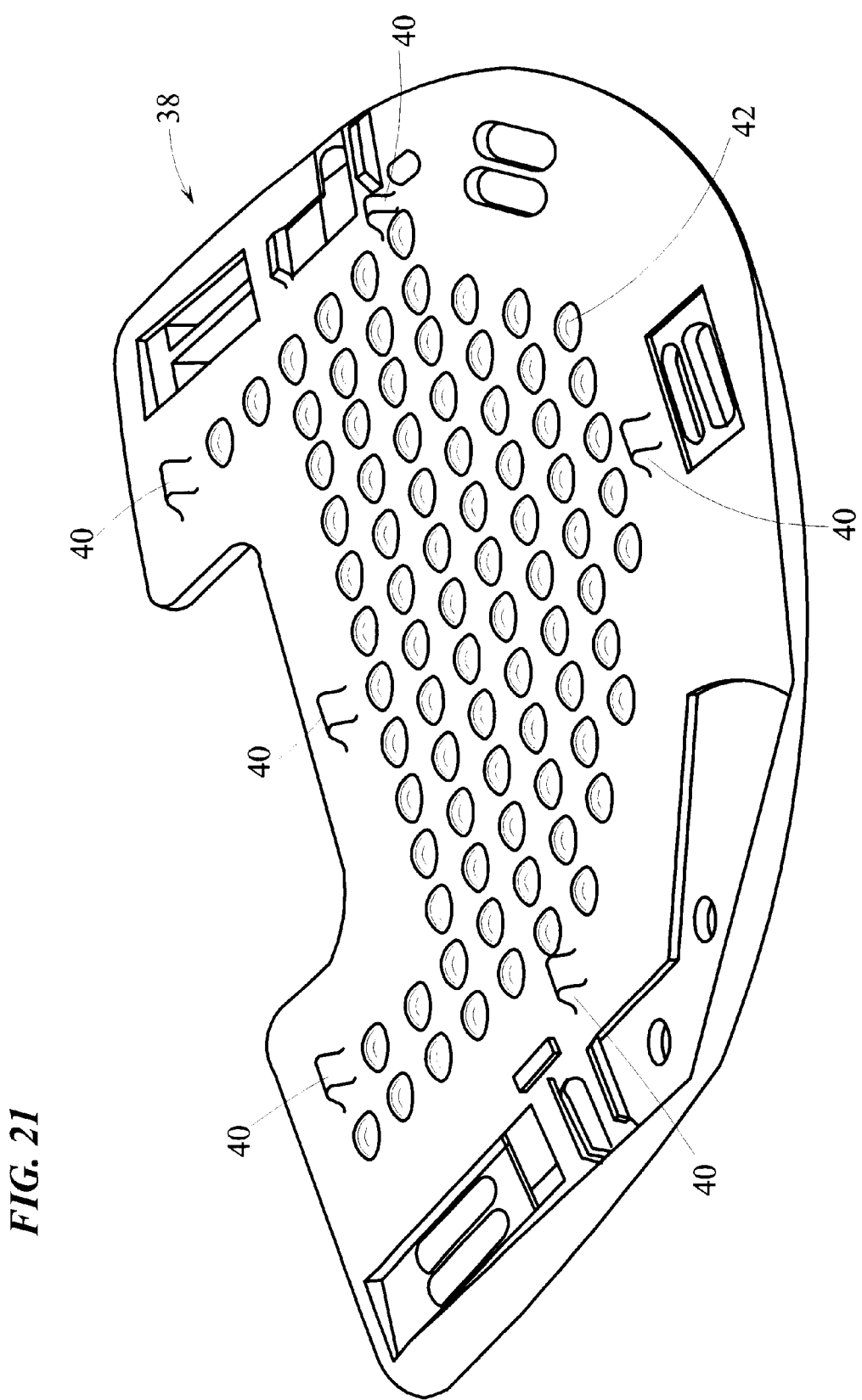
FIG. 21 is a perspective view of a reaction plate of the horn switch assembly.

Turning now to FIG. 21, a perspective view of a reaction plate of the horn switch assembly is illustrated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A membrane horn switch assembly for operating a horn, comprising:

an upper nonconductive sheet having a portion of a surface covered with a first electrically conductive coating;

a lower nonconductive shoot having a portion of a surface covered with a second electrically conductive coating, comprising a first conductive grid and a second conductive grid, said first conductive grid comprising a plurality of first contact members and said second conductive grid comprising a plurality of second contact members each of said plurality of first contact members being interwoven with said plurality of second contact members such that each of said plurality of first contact members are adjacent to four of said plurality of second contact members and each of said plurality of second contact members are adjacent to four of said plurality of First contact members except for the first contact members and the second contact members disposed at a periphery of said second electrically conductive coating, said first electrically conductive coating being in a facially spaced relationship with respect to said second electrically conductive coating;

a nonconductive spacer positioned between said first electrically conductive coating and said second electrically conductive coating, said nonconductive spacer having a plurality of openings aligning with portions of said first conductive grid and said second conductive grid; and a plurality of first concentrators and second concentrators depending upwardly from a reaction surface, said plurality of first concentrators being disposed on said reaction surface so as to not make contact with said lower nonconductive sheet, said plurality of first concentrators being disposed outboard of said periphery of said first electrically conductive coating, said plurality of second concentrators selectively communicating portions of said first conductive grid and second conductive grid to provide an electrical connection between said first electrically conductive coating and said second electrically conductive coating when a force is applied to the horn switch assembly, said plurality of first and second concentrators having different lengths so that said plurality of first concentrators maintain the plurality of second concentrators in a faced spaced relationship with said first and second conductive grids in the absence of said force.

2. The membrane horn switch assembly according to claim 1, wherein said nonconductive spacer comprises a dielectric ink arranged according to a predetermined pattern, the predetermined pattern defining the plurality of openings where the dielectric ink is absent.

3. The membrane horn switch assembly as in claim 1, wherein said reaction surface has a curvature corresponding to a cover of an air bag module.

4. The membrane horn switch assembly as in claim 3, wherein said curvature is about three degrees.

5. The membrane horn switch assembly as in claim 1, wherein the at least one of said plurality of first contact members and at least one of said plurality of second contact members make contact with said first electrically conductive coating upon the application of a force of about 30 Newtons.

\* \* \* \* \*